United States Patent
Ban et al.

[11] Patent Number: 5,934,360
[45] Date of Patent: Aug. 10, 1999

[54] COOLING AND HEATING SYSTEM FOR VEHICLE

[75] Inventors: Takashi Ban; Hidefumi Mori; Kiyoshi Yagi, all of Kariya, Japan

[73] Assignee: Kabushiki Kaisha Toyoda Jidoshokki Seisakusho, Kariya, Japan

[21] Appl. No.: 08/857,978

[22] Filed: May 16, 1997

[30] Foreign Application Priority Data

May 29, 1996 [JP] Japan .................................. 8-134699

[51] Int. Cl.[6] .................................................. B60H 3/00
[52] U.S. Cl. ...................... 165/43; 165/42; 123/142.5 R; 237/12.3 R
[58] Field of Search ................. 165/43, 42; 123/142.5 R; 237/12.3 R

[56] References Cited

U.S. PATENT DOCUMENTS

| | | | |
|---|---|---|---|
| 2,617,399 | 11/1952 | Backus | 123/142.5 R |
| 3,219,103 | 11/1965 | Berry et al. | 165/42 |
| 3,447,596 | 6/1969 | Hughes | 165/42 |
| 3,670,808 | 6/1972 | Wait, Jr. | 165/42 |
| 3,779,307 | 12/1973 | Weiss et al. | 165/42 |
| 3,881,546 | 5/1975 | Otsuka et al. | 165/42 |
| 3,896,872 | 7/1975 | Pabst et al. | 165/42 |
| 4,966,012 | 10/1990 | Iida | 165/42 |
| 4,974,778 | 12/1990 | Bertling | 237/12.3 B |
| 4,993,377 | 2/1991 | Itakura | 123/142.5 R |
| 5,174,254 | 12/1992 | Humburg | 123/142.5 R |
| 5,573,184 | 11/1996 | Martin | 237/12.3 |
| 5,704,320 | 1/1998 | Ban et al. | 123/142.5 R |
| 5,711,262 | 1/1998 | Ban et al. | 123/142.5 R |
| 5,727,510 | 3/1998 | Ban et al. | 123/142.5 R |
| 5,752,474 | 5/1998 | Ban et al. | 123/142.5 R |
| 5,778,843 | 7/1998 | Inoue et al. | 123/142.5 R |

FOREIGN PATENT DOCUMENTS

| | | | |
|---|---|---|---|
| 3-164516 | 7/1991 | Japan | 123/142.5 |
| 3709-444 | 10/1988 | United Kingdom | 123/142.5 R |

*Primary Examiner*—Ira S. Lazarus
*Assistant Examiner*—Terrell McKinnon
*Attorney, Agent, or Firm*—Burgess, Ryan & Wayne

[57] ABSTRACT

A cooling and a heating system for a vehicle having a refrigerant compressor of a variable displacement type and a viscous heater of a variable heating capacity, integrated by a common, intermediate housing. A space needed for an installation into an engine compartment of a vehicle is saved, while the production cost is reduced. Furthermore, a requirement for reduction of a fuel consumption efficiency at a low outside air temperature condition and a degradation of a lubricant at a high outside air temperature condition, which are otherwise contradictory, are harmonized.

9 Claims, 3 Drawing Sheets

COOLING AND HEATING SYSTEM FOR VEHICLE

BACKGROUND OF THE INVENTION

1. Field of the Invention

The present invention relates to an air conditioning system for a vehicle where a heat of engine cooling fluid is used for heating a cabin of a vehicle and a latent heat of a refrigerant is used for cooling the cabin.

2. Description of Related Art

In a conventional air conditioning system for a vehicle, a duct for an air flow for air conditioning a cabin of the vehicle is provided, in which duct an evaporator and a heater core are arranged. At the evaporator, the air is cooled, while, at the heater core, the air is heated. The heater core is connected to an engine cooling water recirculated system for cooling the engine cooling water, so that the hot water discharged from a cooling water jacket by a water pump is taken out at a location between a thermostat and a radiator and is fed to the heater core. The hot water after a heat exchange at the heater core is returned to the engine cooling water recirculating system.

The evaporator is located in a refrigerating system, which is constructed by, in addition to the evaporator, a compressor, a condenser and an expansion valve. In a well known manner, the refrigerant from an outlet chamber of the compressor is subjected to a refrigerating cycle and is returned to an intake chamber of the compressor. The compressor has a drive shaft which is connected to a crankshaft of the internal combustion engine via an electromagnetic clutch and a pulley-belt transmission mechanism, so that a rotating movement of the crankshaft is transmitted to the drive shaft under an engaged condition of the clutch. As for the compressor, a fixed displacement type, where a fluid discharge amount per one rotation of the drive shaft is fixed, or a variable displacement type, where a fluid discharge amount per one rotation of the drive shaft is variable, is used.

In this type of the air conditioning system, the recirculated a hot water, after cooling the internal combustion engine, is diverted from the recirculation system and is used at the heater core for heating the cabin. The thermostat is opened when the temperature of the recirculated water is higher than a predetermined value, so that the recirculated water is directed to the radiator for cooling the water. On the other hand, during a summer season, the electromagnetic clutch is made on so that the compressor is brought into operation, so that a refrigerant of a high temperature and a high pressure is directed to the condenser, whereat the refrigerant is condensed. The condensed refrigerant is subjected to a pressure reduction at the expansion valve and is evaporated at the evaporator, so that the air flow contacted with the evaporator is cooled and is discharged to the cabin.

In such a conventional cooling and heating system for an automobile, the heating of the cabin relies only on the heat generated by the internal combustion engine. Thus, a desired heating of the cabin can not be obtained at the start of the internal combustion engine in a cold region. In view of this problem, the Japanese Unexamined Patent Publication No. 2-246823 proposes a provision of a viscous heater device as an auxiliary heating device which is separate from the internal combustion engine. In such a viscous heater device, shear is generated in a viscous fluid such as a silicone oil, which generates heat which is used for heating recirculated water in a water jacket as a heating chamber. As for the viscous heater device, a fixed capacity type, where a heat generating amount per unit of a rotation of the drive shaft is constant, or a variable capacity type, where a heat generating amount per unit of a rotation of the drive shaft, is variable is used.

The refrigerant compressor is mainly effective at a summer season, while the viscous heater is mainly effective at a winter season. Thus, an arrangement has been proposed, wherein the refrigerant compressor and the viscous heater are separately provided in connection with the internal combustion engine, so that they are independently operated by the engine via an electromagnetic clutch. During the winter season, the refrigerant compressor is stopped, while the viscous heater operated, resulting in a quick start of the heating operation. Contrary to this, during a summer season, the refrigerant compressor is operated, while the viscous heater is stopped, thereby obtaining a desired cooling operation.

However, the use of the electromagnetic clutch for operating the compressor causes the cost to be increased. In order to eliminate the electromagnetic clutch, as a compressor, a variable displacement type can be used, wherein the compressor is directly connected to the crankshaft of the internal combustion engine via a pulley and belt mechanism at a low cost. During a winter season, the variable displacement mechanism of the compressor is controlled so as to obtain the minimum output capacity, thereby substantially canceling the operation of the compressor. However, even if the operation of the compressor is canceled by controlling the variable displacement mechanism, recirculation of the refrigerant is continued in the refrigerating system in which the compressor is arranged, which causes a drag torque to be generated due to the high viscosity of the refrigerant lubricant at the low temperature during the winter season, which causes the fuel consumption efficiency to be reduced.

On the other hand, the employment of the viscous heater also necessitates an electromagnetic clutch for selective transmission of a rotating movement of the engine crankshaft to the viscous heater, which increases the production cost. Employment of the viscous heater of a capacity variable type, can also eliminate the electromagnetic clutch so that the viscous heater is directly operated by the engine crankshaft by means of a pulley and belt mechanism at a reduced cost. Namely, during the summer season, the heating is controlled to the minimum value, resulting in a substantial recirculation heating by the viscous heater. However, during the summer season, the viscous heater is subjected to heating by the atmosphere, which causes the viscous fluid to be quickly degraded.

Furthermore, the refrigerant compressor and the viscous heater, which are separate from each other, cause the size of the system to be increased, which is undesirable in a limited space for installation in an engine compartment and in a requirement of extra parts, such as separate pulleys, resulting in an increase in a production cost.

SUMMARY OF THE INVENTION

An object of the present invention is to provide a cooling and heating system for a vehicle, capable of reducing a space for an installation in an engine compartment while reducing the production cost.

Another object of the present invention is to provide a cooling and heating system for a vehicle, capable of preventing reduction of fuel consumption efficiency during a low atmospheric air temperature state as well as a degradation of viscous fluid during a high atmospheric air temperature state.

According to present invention, a cooling and heating system for a cabin of a vehicle is provided, comprising:

an air conditioning duct for an air flow discharged to the cabin;

a refrigerating system comprising a compressor for compressing a refrigerant, a condenser for receiving the refrigerant, compressed by the compressor, an expansion valve for reducing a pressure of the refrigerant and an evaporator for evaporating the refrigerant, the evaporator being located in said duct for cooling the air flow, and;

a heating system comprising a recirculation conduit for a heating medium and a viscous heater arranged in the recirculation conduit for heating the heating medium under the action of a shearing of a viscous fluid, said viscous heater being arranged in said duct for heating the air flow;

said compressor being of a variable displacement type, while the viscous heater is of a variable capacity type;

said compressor and the viscous heater being integrated by a common housing.

According to the present invention, the refrigerant compressor and the viscous heater are integrated via a common housing, resulting in a reduction of an overall size, which is advantageous, on one hand, for an arrangement in a limited space of an engine compartment of a vehicle and for reducing a number of parts, thereby reducing the production cost, on the other hand.

In the cooling/heating system for a vehicle according to present invention, the use of the variable displacement type of refrigerant compressor is advantageous in that a required cooling capacity is obtained even by an operation at a summer season, while minimizing the output capacity of the compressor during a winter season. Contrary to this, the employment of the variable capacity type of viscous heater allows a required heat generation amount to be obtained during a winter season, thereby obtaining a quick start up of the heating operation, while minimizing an unnecessary heat generation amount, i.e., nullifying the viscous heater during a summer season.

Furthermore, according to present invention, the common housing between the refrigerant compressor and the viscous heater, which are integrated, allows the heat generated at the viscous heater to be transmitted to the compressor to heat the refrigerant in the compressor, thereby reducing a viscosity of a lubricant in the refrigerant during a winter season of a low atmospheric air temperature, which is advantageous in a reduction in a dragging torque, thereby enhancing a fuel consumption efficiency. Contrary to this, during a summer season of an increased atmospheric air temperature, a low temperature of the refrigerant recirculated from the evaporator to an intake chamber of the compressor allows the heat as generated at the viscous heater by the high temperature of the atmospheric air to be transmitted to the compressor via the common housing, resulting in a cooling of the viscous fluid, thereby preventing the latter from being thermally degraded.

In short, the cooling/heating system for a vehicle according to the present invention does not require an increased space for its arrangement in an engine compartment of the vehicle, can reduce the production cost and can prevent a reduction of a fuel consumption efficiency during a low atmospheric air temperature condition as well as a degradation of the viscous fluid during a high atmospheric air temperature condition, while keeping a desired cooling/heating operation of the cabin.

In a second embodiment, the compressor and the viscous heater have a common driving shaft.

According to this system, the rotating movement of the driving shaft causes, simultaneously, the refrigerant compressor to effect a compression operation to discharge the refrigerant and the viscous heater to heat the recirculated fluid in a heat emission chamber due to a shearing of a viscous fluid. Thus, in comparison with a structure for separately driving the shafts, a reduction of an overall size is obtained, which is suitable for an installation in a limited space in an engine compartment and a reduction of a number of parts is obtained, which is advantageous in a reduced production cost.

As a common driving shaft, an one piece member can be conveniently employed. As an alternative, separate shafts, which are integrated by a connecting means, such as a spline engagement), can be employed. In order to transmit a rotating movement from an internal combustion engine, in addition to a pulley, in place of a direct connection by a pulley, an electromagnetic clutch can be employed.

In a third embodiment, the vehicle includes an internal combustion engine and wherein said system further comprises a pulley on the drive shaft, which pulley is directly driven by the internal combustion engine.

In this system, in order to drive the shaft, only a connection by a pulley and belt system is employed, which is less expensive then employment of an electromagnetic clutch. The use of only the belt-pulley mechanism causes the drive shaft to be always rotated by the engine, which does not cause an efficiency to be reduced since the compressor is of a variable displacement type and the viscous heater is of a variable capacity type.

In a fourth embodiment, the vehicle includes an internal combustion engine provided with a cooling fluid recirculating system for cooling the internal combustion engine including a heat emission chamber in a body of the engine, a radiator for emitting a heat from the cooling fluid and a thermostat for selectively connecting the heat emission chamber to the radiator in accordance with the temperature of the engine cooling fluid.

In this system, the thermostat is opened when a fully warmed up condition of the engine is obtained, which is desirable in that an effective heating of the cabin is done by the recirculated fluid at the heat emission chamber of the engine, while the engine is prevented from being excessively heated due to the cooling of the engine cooling fluid at the radiator.

In a fifth embodiment the heater core is in connection with the recirculation system at a location upstream from the thermostat.

In this system, a cooled state of the recirculated cooling fluid causes the thermostat to be closed, so that an effective heating operation at the viscous heater is obtained due to a small amount of the recirculated engine cooling fluid, thereby obtaining a quick start-up of the heating operation.

In a sixth embodiment, the viscous heater includes a heat emission chamber, and wherein the system further comprises by-pass control means connected to the heat emission chamber of the viscous heater in accordance with the temperature of the engine cooling fluid.

In this system, the recirculated engine cooling fluid by-passes the heat emission chamber of the viscous heater, resulting in a reduction of a flow resistance of the recirculated fluid. Thus, a reduction of the driving power of a fluid recirculating pump such as a cooling water pump is obtained.

BRIEF EXPLANATION OF ATTACHED DRAWINGS

DETAILED EXPLANATION OF PREFERRED EMBODIMENTS

Figure 1:
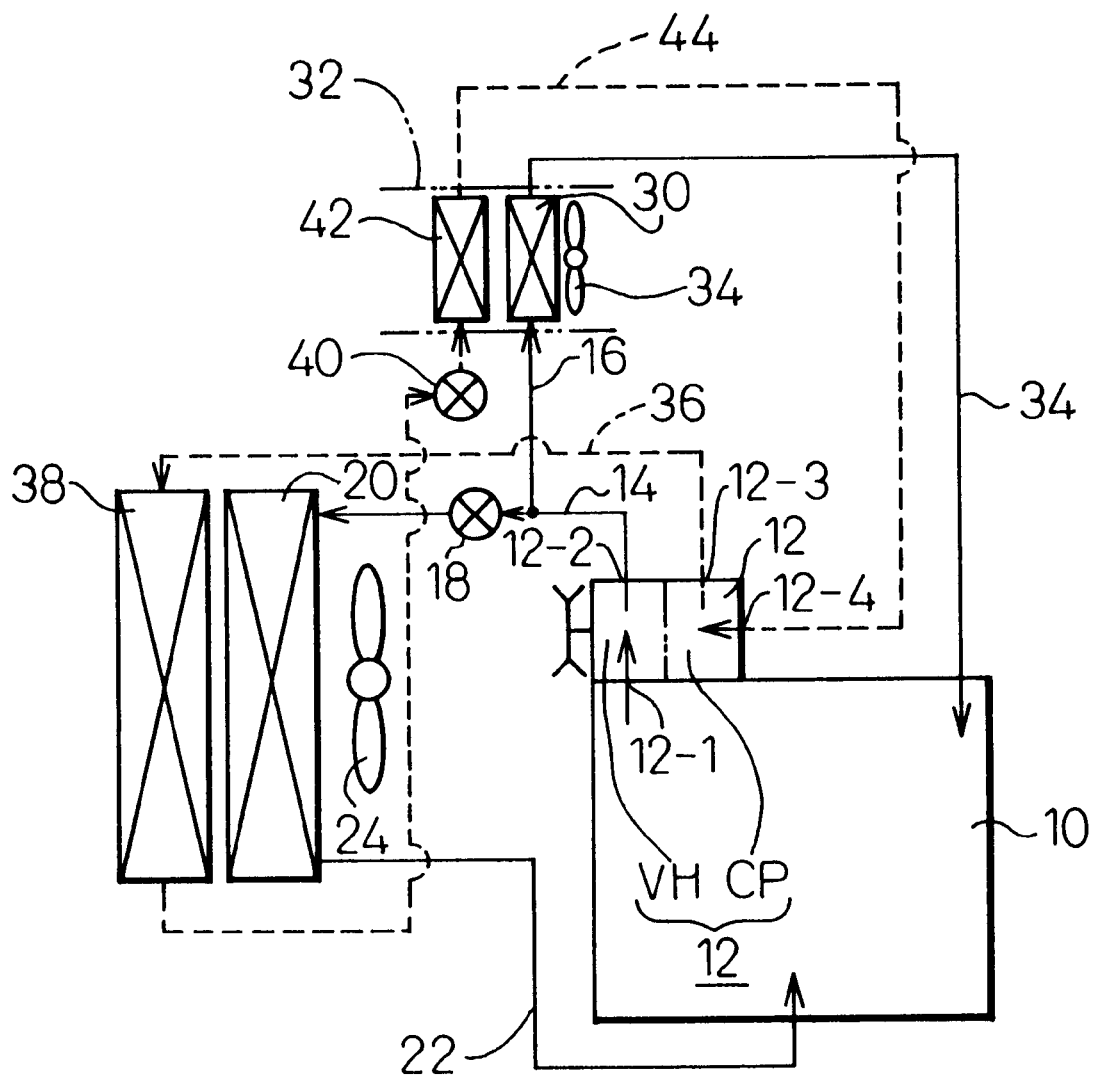
FIG. 1 is a general schematic view of a heating/cooling system for a vehicle according to the present invention.

In FIG. 1, showing a general construction of an air conditioning system according to the first embodiment of the present invention, reference numeral 10 denotes a body of a water cooled internal combustion engine, and 12 a refrigerant compressor which is integrated with a viscous heater as described later which has an water inlet port 12-1 and water outlet port 12-2. In a well known manner, the engine body 10 is formed with a cooling water jacket as a heat emission chamber, which is in connection with the water inlet port 12-1. A main water pipe 14 is, at its one end, connected to the water outlet port 12-2. The other end of the main pipe 14 is first branched to a sub water pipe 16 and is connected, via a thermostat 18, to a radiator 20 at its water inlet. The radiator 20 is, at its water outlet, connected to a return pipe 22, so that the engine cooling water after subjected to a cooling at the radiator 20 is returned to the engine cooling water jacket. A cooling fan 24 is arranged to face the rear side of the radiator 20. In a well known manner, a rotating movement of the fan 24 causes an air flow to be generated, so that the air flow is in contact with the radiator 20, resulting in a heat exchange between the radiator 20 and the air flow, thereby cooling the engine cooling water flowing in the radiator 20.

The sub pipe 16 is connected to a heater core 30 which arranged in an air conditioning duct 32 having an upstream end (not shown) for introduction of an outside air and a downstream end (not shown) opened to a cabin for discharging an air for air-conditioning the cabin. A fan 34 is arranged to face with the heater core 30 for generating the air flow in the duct 32. Namely, a heat exchange occurs between the hot water in the heater core 30 and the air flow in the duct 32, so that the air flow is heated prior to discharge into the cabin. The heater core 30 is connected to a return pipe 34, so that the engine cooling water after the heat exchange at the heater core 30 is returned to the engine water jacket in the engine for the recirculation of the engine cooling water.

A construction for the recirculation of the refrigerant will be explained. The compressor 12 integrated with the viscous heater includes a refrigerant outlet 12-3 which is connected, via a outlet pipe 36, to a condenser 38 at its inlet. The outlet of the condenser 38 is connected, via an expansion valve 40, to an evaporator 42 arranged in the air conditioning duct 32 at a location upstream from the heater core 30. The evaporator 42 is connected, via an outlet pipe 44, to the compressor 12 at a refrigerant inlet 12-4.

Figure 2:
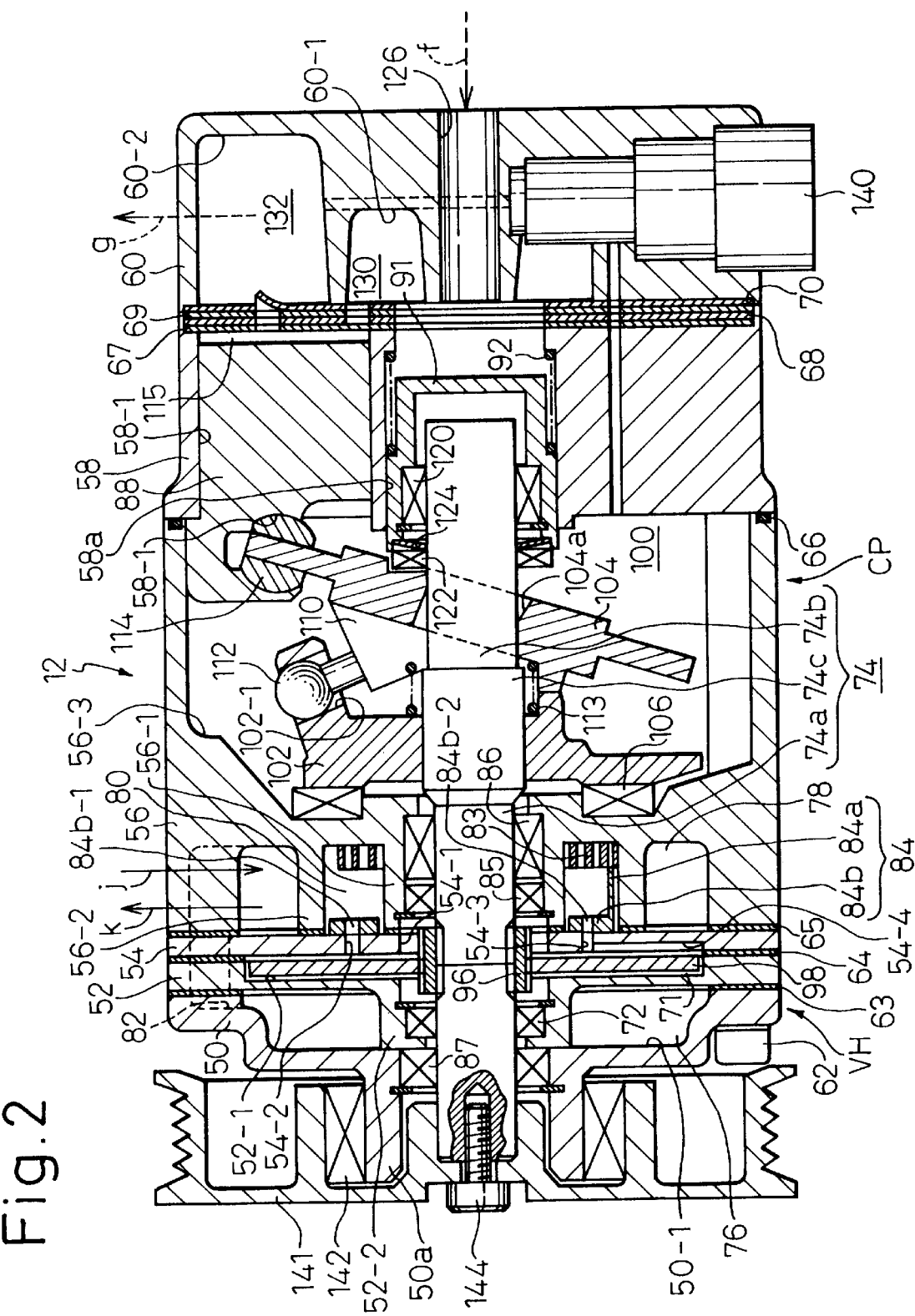
FIG. 2 is a longitudinal cross-sectional view of a viscous heater integrated compressor according to present invention.

The compressor 12 integrated with the viscous heater as shown in FIG. 2 includes a front housing 50, a front plate 52, a rear plate 54, an intermediate housing 56, a cylinder block 58 and a rear housing 60, which are connected with each other by means of a plurality of circumferentially spaced bolts 62. Gaskets 63, 64 and 65 are arranged between the front housing 50 and the front plate 52, between the front plate 52 and the rear plate 54 and between the rear plate 54 and the intermediate housing 56, respectively. An O-ring 66 is arranged between the intermediate housing 56 and the cylinder block 58. Furthermore, between the cylinder block 58 and the rear housing 60, a plate shaped intake valve 67, a valve plate 68, a plate shaped outlet valve 69 and a gasket 70 with an integrated function as a retainer are arranged.

First, a construction of a viscous heater part VH will be explained. The front plate 52 is formed with a recess 52-1 faced with the rear plate 54, so that a heat generating chamber 71 is formed between the plates 52 and 54. Furthermore, the front plate 52 is formed with a central boss portion 52-2, which extends axially toward the front housing 50. A front shaft seal unit 72 is housed in the boss portion 52-2 of the front plate 52 for obtaining a liquid seal of a drive shaft 74. The rear plate 54 is formed with a central opening 54-1 aligned with and of the same diameter as that of the inner opening of the boss portion 52-2 of the front plate 52. At a location higher than the central opening 54-1, the rear plate 52 is formed with a first recovery hole 54-2 extending axially through the rear plate 54. At a location lower than the central opening 54-1, the rear plate 54 is formed with a first feed hole 54-3 extending axially through the plate 54. Furthermore, the rear plate 54 is, at its side faced with the front plate 52, formed with a feed groove 54-4 extending from the first feed hole 54-3 to a bottom area of the heat generating chamber 71.

The front housing 50 is, at side faced with the front plate 52, a recess 50-1, which cooperates with the plate 52 to form a front water jacket 76 as a front heat emission chamber.

The intermediate housing 56 is formed with an inner annular rib 56-1 and an outer annular rib 56-2, which extend axially so that the ribs 56-1 and 56-2 abut, at their axial end surfaces, the gasket 65. As a result, between the rear plate 54 and the intermediate housing 56 at a location outside of the outer rib 56-2, a rear water jacket 78, as a rear heat emission chamber located adjacent to the rear part of the heat generating chamber 71, is formed. Furthermore, between the rear plate 54 and the intermediate housing 56 at a location between the inner and the outer ribs 56-1 and 56-2, a control chamber 80, which functions as a reservoir chamber, is formed. The water inlet 12-1 in FIG. 1 is opened to the water jacket for introducing the water as shown by an arrow j, while the water outlet 12-2 in FIG. 1 is opened to the water jacket for removing the water as shown by an arrow k. In order to do this, the intermediate housing 56 has, at its outer side, a water inlet port and a water outlet port, which are not shown in the drawings and which are formed in such a manner that the water inlet and outlet ports are in communication with the rear water jacket 78. The front and rear plates 52 and 54 are formed with circumferentially spaced aligned pairs of bores forming water passageways 82 at locations between adjacent bolts 62. These passageways 82 connect the front and rear water jackets 76 and 78 with each other.

In the control chamber 80, a bimetal member 83 of a coiled shape as a temperature sensitive actuator and a valve 84 comprised by a shaft portion 84a and a rotating member 84b are arranged. The bimetal member 83 has an inner end fixedly connected to the inner rib 56-1 at its outer circumferencial wall and an outer end fixedly connected to the rotating part 84b of the valve 84. The bimetal member 83 is displaced in accordance with the degree of the heating temperature. Namely, the displacement of the bimetal member 83 is commenced at a predetermined temperature. The rotating part 84b of the valve 84 is urged to a position where the rotating part 84b closes the first recovery hole 54-2, as well as the first feed hole 54-3, at ends adjacent the control chamber 80. The rotating part 84b of the valve 84 is formed with a second recovery hole 84b-1 and second feed holes 84b-2, which are in communication with the first recovery hole 54-2 and the first feed hole 54-3, respectively depending on the rotating position of the rotating part 84b of the rotary valve 84.

Inside the inner ring 56-1 of the intermediate housing 56, a rear shaft seal unit 85 and a rear bearing unit 86 are arranged on the shaft 74.

The front housing 50 is formed with a boss portion 50a, inside of which a front bearing member 87 is arranged for supporting the shaft 74.

A construction of the compressor part CP will now be explained. The cylinder block 58 is formed with a plurality of circumferentially spaced cylinder bores 58-1, in which respective pistons 88 are axially reciprocated, and a stepped central bore 58a which extends axially therethrough. An operating member 91 of a stepped tubular shape with a closed bottom is slidably inserted to the bore 58a. A spring 92 is arranged between an inner shoulder formed along the inner periphery of the bore 58a and an outer shoulder formed along the outer periphery of the operating member 91, so that the operating member 91 is moved away from the rear housing 60.

The drive shaft 74 is constructed by a front part 74a, a rear part 74b and an intermediate part 74c between the front and the rear parts 74a and 74b. The front part 74a of the shaft 74 is constructed with a spline shaft to which a sleeve 96 having, at its inner and outer surfaces, a spline is axially slidably inserted, while the sleeve is fixedly connected to the shaft 74 in the sense of the rotating movement. A disk shaped rotor 98, which is located in the heat generating chamber 71, has an axial spline at its inner periphery, which is fitted to the spline part of the shaft 74, so that the shaft 54 is also fixedly connected to the rotor 98 in the sense of the rotating movement.

A silicone oil is filled in the heat generating chamber 71 so that the oil contacts with an outer surface of the rotor 98 and an inner surface of the heat generating chamber 71.

The intermediate housing 56 is at its rear side formed with a cylindrical recess 56-3, which forms, in cooperation with the cylindrical block 58A, a crank chamber 100, in which a lug plate 102 and a swash plate 104 are arranged. The lug plate 102 is press fitted to the intermediate part 74c of the shaft 74. A first bearing unit 106 is arranged between faced axial surfaces of the intermediate housing 56 and the lug plate 102. The swash plate 104 has a central guide hole 104a, to which the rear part 74b of the shaft 74 is inserted, so that a tilting angle of the swash plate 104 with respect to the axis of the shaft is varied. A pair of parallel arms 110 extends integrally forom the rear side of the swash plate 104. Each of the arms 110 is provided with a spherical pin 112, which is slidably inserted to a guide hole 102-1 formed in the lug plate 102. A spring 113 is arranged between the lug plate 102 and the swash plate 104 for urging the swash plate 104 to be moved toward the cylinder block 58. This arrangement allows the tilting angle of the swash plate 104 to be varied in accordance a pressure difference between the crank chamber 100 and the intake chamber.

The swash plate 104 is, at its outer periphery, engaged with the pistons 88 via shoes 114 of a semipherical shape, which are received to semispherical recess 58-1 of the corresponding pistons 58. As a result, a rotating movement of the swah plate 104 causes the piston 88 to be axially reciprocated in the corresponding cylinder bores 58-1. During the movement of the piston 88 in a direction away from the rear housing 60, a volume of a operating chamber 115 on one side of the piston 88 in the corresponding cylinder bore 58-1 is increased, thereby executing an intake operation. Contrary to this, during the movement of the piston 88 in the opposite direction toward the rear housing 60, a volume of a operating chamber 115 is reduced, thereby executing a compression operation. It should be noted that the pistons 88 are prevented from executing the reciprocating movement at the minimum displacement (tilting angle) condition of the swash plate 104.

The cup shaped operating member 91, which is axially slidable with respect to the cylinder block 58, is supported by a slide bearing unit 120. A thrust bearing 122 is arranged facing the swash plate 104, and a disk shaped spring 124 is arranged between the thrust bearing 122 and the operating member 91, which causes the swash plate 104 and the operating member 91 to be in a side-by-side contacted condition.

The housing 60 is formed with an intake port 126 connected to a refrigerant source for receiving the refrigerant as shown by an arrow f. The housing 60 is further formed with a first and a second recess 60-1 and 60-2, which cooperate with the gasket 65 to form, respectively, an inlet chamber 130 adjacent the inlet port 126 and an outlet chamber 132 located outwardly from the inlet chamber 130 for discharging the compressed refrigerant as shown by an arrow g.

A capacity control valve 140 as the capacity control valve, a structure as disclosed in EP-A-628,722 can be employed, is provided, which is responsive to an inlet pressure. Namely, an increased intake pressure at an intake chamber 130, when a cooling requirement is high, is detected, which causes the valve 140 to allow the refrigerant of a high pressure at an outlet chamber 132 to be introduced into the crank chamber 100. In a well known manner, during the intake stroke where the piston 88 is moved away the rear housing 60, the refrigerant in the intake chamber 130 is sucked, via the intake valve 67, into the operating chamber 115. During the outlet stroke, where the piston 88 is moved toward the rear housing 60, the refrigerant from the operating chamber 115 is discharged, via the outlet valve 69, into the exhaust chamber.

A pulley 141 is rotatably mounted on the boss portion 50a of the front housing via a bearing unit 142 and is connected, by a bolt 144, to an end of the front part 74a of the rotating shaft 74 projected out of the front housing 50. The pulley 141 is connected to a rotating movement source such as a crankshaft 150 (FIG. 3 of an internal combustion engine via a power transmitting member such as a belt 152.

In the construction of the compressor integrated with the viscous heater according to the present invention, the intermediate housing 56 is commonly used between the viscous heater part VH located at the front side and the refrigerant compressor part CP located at the rear side. This integrated structure between the viscous heater part VH and the compressor part CP is combined with the directly connected structure of the pulley 166 on the shaft 74 via the bearing unit 142, which pulley 166 is in a kinematic connection with the engine crank shaft. According to present invention, the integrated structure together an elimination of an electromagnetic clutch on the drive shaft reduces the production cost.

Figure 3:
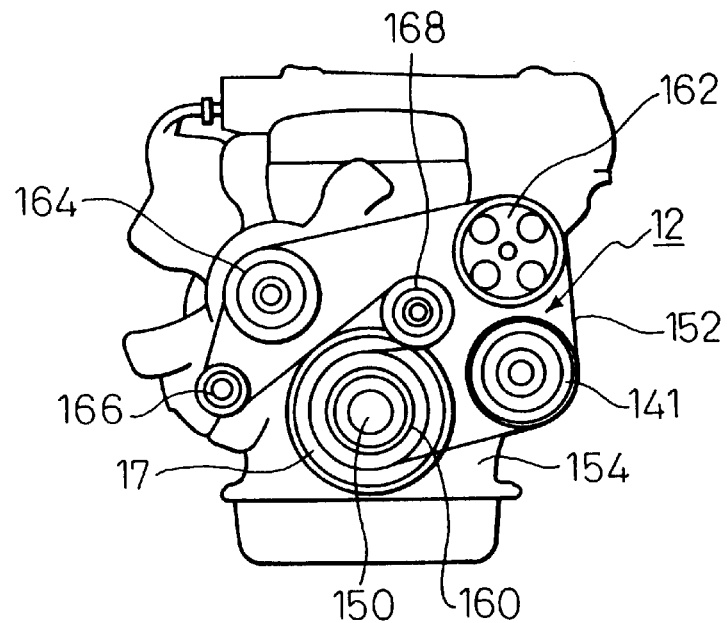
FIG. 3 is a front elevational view of the internal combustion engine equipped with the viscous heater integrated compressor in FIG. 2.

In FIG. 3, which shows a front elevational view of the internal combustion engine, the compressor 12 wherein the viscous heater part VH is integrated with the compressor part CP is mounted to a body 154 of the engine by using a suitable member such as a bracket (not shown). The pulley 141 on the drive shaft 74 is in kinematic connection with a pulley 160 on the crank shaft 150 of the engine via the belt 152. In FIG. 3, a pulley 162 for a power steering device (not shown), a pulley 164 for a water pump (not shown) and a pulley 166 for an alternator (not shown). These pulleys 162 to 166 are together with an idler pulley 168 driven by the same belt 152, which is advantageous in a compactness of the power transmission system, which is suitable for storage in a limited space of an engine compartment or an automobile.

In the heating-cooling system according to present invention, the rotating movement of the crankshaft 150 of the internal combustion engine causes the drive shaft 74 of the compressor 12 to be always rotated due to the fact the pulley 141 is fixedly connected to the drive shaft 74. The rotating movement of the shaft 74 causes, in the variable compressor part CP, the pistons 88 to be reciprocated in the corresponding cylinder bores 58-1 in accordance with the tilting angle of the swash plate 104, so that the refrigerant in the intake chamber 130 is sucked into the operating chambers 115 and the resultant compressed refrigerant is discharged into the outlet chamber 132 and that, in the viscous heater section VH, the rotating movement of the rotor 98 in the heat generating chamber 71 causes the silicone oil filled therein to be subjected to a shearing, thereby generating a heat for heating the recirculating water flowing in the front and rear water jackets 76 and 78.

In the operation of the compressor part CP, during a summer season, the capacity control valve 140 is such that a pressure at the crank chamber 100 is reduced, thereby increasing the tilting angle of the swash plate 104, resulting in an increased displacement (stroke) of the pistons 88. Thus, an increased amount of the refrigerant for executing a desired cooling of the cabin is obtained. Contrary to this, during a winter season, the capacity control valve 140 is such that a pressure at the crank chamber 100 is increased, thereby decreasing the tilting angle of the swash plate 104, resulting in a reduced displacement of the pistons 88. Thus, a decreased amount of the refrigerant is obtained, i.e., a compression operation is not substantially done, while an amount of the refrigerant is kept in the compressor part CP.

In the operation of the viscous heater part VH, during a winter season, a low temperature of the silicone oil causes the bi-metal coil spring 83 to turn the rotary valve 84 in a positive direction to a position, so that the silicone oil in the control chamber 80 is introduced into the heat generating chamber 71 via the second feed hole 84b-2, the first feed hole 54-3 and the feed groove 54-4, so that an desired amount of the heat is generated in the chamber 71 for executing a quick heating operation. Contrary to this, during a summer season, a high temperature of the silicone oil causes the bi-metal coil spring 83 to turn the rotary valve 84 in a negative direction to a position, so that the silicone oil in the heat generating chamber 71 is recovered into the control chamber 80 via the second recovery hole 54-2 and the first recovery hole 84b-1 under a so-called Weissenberg effect, wherein the silicone oil as a viscous liquid is concentrated around the central axis against the effect of a centrifugal force. It is believed that such a Weissenberg effect is occurred due to a normal stress effect. In this condition, a heating amount at the viscous heater part VH is substantially nullified.

The integrated structure, due to the intermediate housing 56 between the viscous heater part VH and the compressor part CP, allows the heat generated at the viscous heater VH to be transmitted to the compressor part CP via the intermediate housing 56, resulting in a reduction of the viscosity of the lubricating oil in the parts of the compressor part CP, such as the crank chamber 100 during the low temperature condition of the lubricant oil such as in a winter season. As a result, only a small drag torque is generated in the engine, thereby enhancing the fuel consumption efficiency. On the other hand, during the summer season of a high outside air temperature, due to a low temperature of the refrigerant recirculated into the intake chamber 130 of the compressor part CP, the heat of the viscous heater VH as generated by the outside air is emitted to the compressor part CP by way of the intermediate housing 56, resulting in a cooling of the silicone oil, thereby preventing it from being overheated.

Furthermore, the construction according to present invention allows the number of parts to be reduced, such as brackets, pulleys (electromagnetic clutch), which would otherwise be necessary in order to allow a viscous heater as well as a compressor to be separately connected to an engine body.

Furthermore, during a closed condition of the thermostat 18 to shut off the main water pipe 14 with respect to the radiator 20, the amount of the recirculated water into the water jacket of the viscous heater VH is reduced, thereby increasing the speed of the heating at the viscous heater, so that a quick start-up of the heating operation can be realized. When a warmed-up state of the engine is obtained, the thermostat 18 is made opened, which allows the water to be directed to the radiator 20, whereat the water is subjected to a cooling, thereby keeping a desired temperature of the engine.

In short, the embodiment in FIGS. 1 and 2 is advantageous in that the system for installation in the engine compartment is reduced, while its production cost is small, and a reduction of a fuel consumption efficiency during a low outside air temperature as well as a quick degradation of the silicone oil during a high outside air temperature, which contradict each other, are prevented, resulting in an effective heating and cooling operation of a vehicle cabin.

Figure 4:
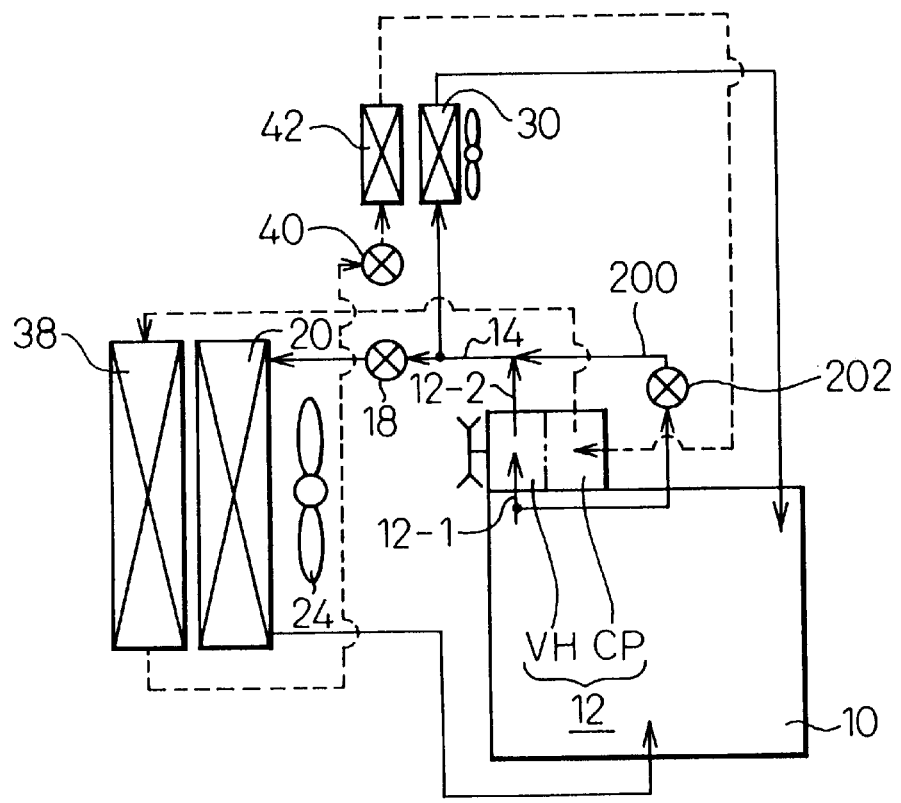
FIG. 4 is similar to FIG. 1 but illustrates a modification provided with a by-pass system for by-passing the viscous heater when the temperature of the engine cooling water is increased.

In a modification shown in FIG. 4, a by-pass cooling water conduit 200 is connected to the main cooling water conduit 14 in such a manner that the viscous heater part VH is by passed. Namely, the by-pass conduit 200 is, at its one end, is connected to the water inlet 12-1 and is, at its other end, connected to the water outlet 12-2. Furthermore, a by-pass control valve 202, such as an electromagnetic ON-OFF valve, is arranged on the by-pass conduit 200. The valve 202 is provided with an electric actuator (not shown) which is connected to a controller (not shown) issuing electric signal to the electric actuator in accordance with a temperature of the engine cooling water. The remaining structure of the second embodiment is the same as that of the first embodiment in FIGS. 1 to 3 and the detailed explanation is eliminated while using the same reference numerals to the same parts.

In the operation of the by-pass control valve 202, a temperature of the engine cooling water lower than a predetermined value causes the by-pass control valve 202 to take a closed position where the engine cooling water is introduced into the water jackets (76 and 78 in FIG. 2) of the viscous heater part VH whereat the heating of the water is done, resulting in a quick start-up of the heating operation by the heater core.

When the temperature of the engine cooling water becomes higher than the predetermined value, an electric signal is sent to the by-pass control valve 202 which causes the by-pass control valve 202 to take an opened position where the engine cooling water passes through the by-pass conduit 200. In other words, the engine cooling water is prevented from being directed to the water jackets of the viscous heater part VH of an increased flow resistance, resulting in a saving of a driving power of the internal combustion engine.

The by-pass control valve 202 is not necessarily be an electromagnetic type. Namely, a control valve 202 of a thermostat type can be employed, which is operated in accordance with a temperature of the water in the water pipe.

We claim:

1. A cooling and heating system for a cabin of a vehicle comprising:

an air conditioning duct for an air flow discharged to the cabin;

a refrigerating system comprising a compressor for compressing a refrigerant, a condenser for receiving the refrigerant compressed by the compressor, an expansion valve for reducing pressure of the refrigerant and an evaporator for evaporating the refrigerant, the evaporator being located in said duct for cooling the air flow, and;

a heater core arranged in the air conditioning duct for heating the air;

a heating system comprising a recirculation conduit for a heating medium and a viscous heater having a heat emission chamber, the heat emission chamber of the viscous heater being arranged in the recirculation conduit for heating the heating medium under the action of a shearing of a viscous fluid;

said compressor being of a variable displacement type, and the viscous heater being of a variable capacity type;

said compressor and the viscous heater being integrated by a common housing.

2. A system according to claim 1, wherein the compressor and the viscous heater have a common driving shaft.

3. A system according to claim 2, wherein said vehicle includes an internal combustion engine and wherein said system further comprises a pulley on the drive shaft, which pulley is directly driven by the internal combustion engine.

4. A system according to claim 2, wherein said variable compressor is of a swash plate type having a drive shaft, a swash plate member on the drive shaft and rotatably driven by the shaft, a cylinder body having a cylinder bore, a piston reciprocated in the cylinder bore, a shoe for connecting the swash plate with the piston, an intake chamber for introduction of the refrigerant into the cylinder bore and an outlet chamber for receiving of the refrigerant from the cylinder bore.

5. A system according to claim 2, wherein said variable viscous heater comprises a drive shaft, a heat generating chamber, a rotor connected with the drive shaft and arranged in the heat generating chamber, a viscous fluid being stored in the heat generating chamber so that the viscous fluid is in contact with the rotor, a control chamber for controlling the amount of the viscous fluid in the heat generating chamber, a first passageway for introducing the viscous fluid from the control chamber to the heat generating chamber, a second passageway for recovering the viscous fluid from the heat generating chamber to the control chamber, and a valve means for selectively opening or closing at least one of the first and the second passageways.

6. A system according to claim 1, wherein said vehicle includes an internal combustion engine provided with a fluid recirculating system for cooling the internal combustion engine including a heat emission chamber in a body of the engine, a radiator for emitting heat from the cooling water and a thermostat for selectively connecting the heat emission chamber of the engine to the radiator in accordance with the temperature of the engine cooling fluid.

7. A system according to claim 6, wherein the heater core is connected with the recirculation system at a location upstream from the thermostat.

8. A system according to claim 6, and wherein the system further comprises by-pass control means for selectively by-passing the heat emission chamber of the viscous heater in accordance with the temperature of the engine cooling fluid.

9. A system according to claim 8, wherein said by-pass control means comprises a by-pass conduit by-passing the heat emission chamber of the viscous heater and a by-pass control valve arranged on the by-pass conduit for controlling the flow of the engine cooling fluid to the by-pass conduit in accordance with the temperature of the cooling water.

\* \* \* \* \*